(12) United States Patent
Hu et al.

(10) Patent No.: US 9,386,521 B2
(45) Date of Patent: Jul. 5, 2016

(54) CLOCK STRUCTURE FOR REDUCING POWER CONSUMPTION ON WIRELESS MOBILE DEVICES

(71) Applicant: QUALCOMM INCORPORATED, San Diego, CA (US)

(72) Inventors: Tao Hu, Shanghai (CN); Yugang Yang, Shanghai (CN); Ting Xie, Shanghai (CN); Tianyou Cai, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/443,955

(22) PCT Filed: Dec. 20, 2012

(86) PCT No.: PCT/CN2012/086994
§ 371 (c)(1),
(2) Date: May 19, 2015

(87) PCT Pub. No.: WO2014/094266
PCT Pub. Date: Jun. 26, 2014

(65) Prior Publication Data
US 2015/0296452 A1    Oct. 15, 2015

(51) Int. Cl.
*H03D 3/24* (2006.01)
*H04W 52/02* (2009.01)
*H04L 7/033* (2006.01)

(52) U.S. Cl.
CPC ......... *H04W 52/0209* (2013.01); *H04L 7/0331* (2013.01); *H04W 52/0274* (2013.01); *Y02B 60/50* (2013.01)

(58) Field of Classification Search
CPC ............ H04B 1/40; H04B 3/23; H04B 1/403; H04L 27/2601; H04L 1/0025; H04L 7/033; H04L 7/0008; H04L 7/02; H04L 7/0331; H04L 7/0337; H03L 7/0891; H03L 7/093; H03L 7/087; H03L 7/18
USPC .................. 375/376, 375, 354, 295, 316, 219
See application file for complete search history.

(56) References Cited

U.S. PATENT DOCUMENTS

| 5,579,353 A | 11/1996 | Parmenter et al. |
| 7,036,032 B2 | 4/2006 | Mizuyabu et al. |

(Continued)

FOREIGN PATENT DOCUMENTS

| CN | 101013477 A | 8/2007 |
| CN | 101098157 A | 1/2008 |

(Continued)

OTHER PUBLICATIONS

International Search Report and Written Opinion—PCT/CN2012/086994, International Search Authority—European Patent Office, Sep. 26, 2013.

*Primary Examiner* — Zewdu Kassa
(74) *Attorney, Agent, or Firm* — Paradice and Li LLP (57) ABSTRACT

A mobile device (300) includes an oscillator (310) to generate a reference clock signal, a phase-locked loop (PLL) circuit (320) to generate a PLL output clock signal, a transceiver (330), a system-on-a-chip (SOC) (340) including a processor (342) and a number of other modules, and a control logic (350). The transceiver (330) generates a status control signal that indicates whether the transceiver (330) is in an active state or in an idle state. The control logic (350) receives the status control signal, and in response thereto, selectively enables/disables the PLL circuit (320), selectively routes either the reference clock signal or the PLL output clock signal to the processor (342) and/or the other modules of the SOC (340), and/or selectively routes either an idle clock signal or the PLL output clock signal to the transceiver (330).

32 Claims, 5 Drawing Sheets

(56) References Cited

U.S. PATENT DOCUMENTS

| | | |
|---|---|---|
| 7,054,287 B2 | 5/2006 | Mucke |
| 7,902,926 B2 | 3/2011 | Yuan et al. |
| 8,036,710 B2 | 10/2011 | Walton et al. |
| 2004/0023680 A1 | 2/2004 | Hulvey |
| 2005/0215275 A1* | 9/2005 | Edwards ............ H04W 52/029 455/522 |
| 2008/0317185 A1 | 12/2008 | Mueller |
| 2011/0012663 A1* | 1/2011 | Crowley ................ G06F 1/04 327/299 |

FOREIGN PATENT DOCUMENTS

| CN | 101641866 A | 2/2010 |
|---|---|---|
| CN | 101963670 A | 2/2011 |

* cited by examiner

CLOCK STRUCTURE FOR REDUCING POWER CONSUMPTION ON WIRELESS MOBILE DEVICES

TECHNICAL FIELD

The present embodiments relate generally to electronic communications, and specifically to reducing power consumption in mobile communication systems.

BACKGROUND OF RELATED ART

As mobile communication devices such as smartphones, tablets, and laptops become more powerful, their power consumption increases. For example, many mobile devices now include multiple wireless transceivers that allow the devices to communicate with other devices using a variety of different wireless communications governed, for example, by Wi-Fi standards, Bluetooth standards, and/or cellular standards. In addition, many such devices may also include global navigation satellite system (GNSS) receivers and/or radio transceivers. These wireless transceivers consume a significant amount of power, particularly when operating at ever-increasing data rates. In addition, these various wireless transceivers, as well as other components (e.g., processor cores, memory resources, and so on) typically provided within such mobile devices, may be clocked using clock signals having different frequencies. As a result, numerous power-hungry circuits such as phase-locked loop (PLL) circuits that can generate clock signals of different frequencies may be provided within such mobile devices. Because mobile devices are typically powered by limited power supplies (e.g., by batteries), reducing their power consumption is desirable.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method and apparatus for reducing power consumption in devices or systems such as mobile devices are disclosed. In accordance with the present embodiments, a device includes an oscillator to generate a reference clock signal, a phase-locked loop (PLL) circuit to generate a PLL output clock signal in response to the reference clock signal, a transceiver to exchange data signals with other devices, a system-on-a-chip (SOC) including processor and a number of other modules, and control logic. The transceiver includes an output terminal to generate a status control signal that indicates whether the transceiver is in an active state or in an idle state. The control logic receives the status control signal, and in response thereto, selectively enables/disables the PLL circuit, selectively routes either the reference clock signal or the PLL output clock signal to the processor and/or the other modules of the SOC, and/or selectively routes either an idle clock signal or the PLL output clock signal to the transceiver.

More specifically, when the transceiver is in an active state (e.g., as indicated by an asserted state of the status control signal), then the control logic enables the PLL circuit so that the transceiver, processor, and/or the other modules of the device may use clock signals generated by (or derived from) the PLL circuit. The control logic also routes the PLL's output clock signal to the transceiver, processor, and/or other modules of the device. Conversely, when the transceiver is in an idle state (e.g., as indicated by a de-asserted state of the status control signal), then the control logic disables the PLL circuit, thereby reducing power consumption in the device. In addition, the control logic routes the reference clock signal to the processor and/or other modules of the device, and routes an idle clock signal to the transceiver. Thus, by selecting different clock sources for the processor and/or other modules of the device when the transceiver is idle, the present embodiments may allow the PLL circuit to be disabled (to reduce power consumption) while still providing clock signals to the processor and/or other modules of the device.

For some embodiments, a fractional clock divider circuit may be used to generate one or more clock signals for the processor and/or the other modules, for example, when the processor and/or the other modules are to be clocked by a clock signal having a different frequency than the reference clock signal.

BRIEF DESCRIPTION OF THE DRAWINGS

The present embodiments are illustrated by way of example and are not intended to be limited by the figures of the accompanying drawings, where.

Like reference numerals refer to corresponding parts throughout the figures.

DETAILED DESCRIPTION

A method and apparatus for reducing power consumption in mobile devices are disclosed. The present embodiments are described below in the context of mobile devices having a processor core and a number of wireless transceivers for simplicity only. It is to be understood that the present embodiments are equally applicable for reducing power consumption in other devices that include a plurality of components or modules clocked by one or more clock signals having one or more different frequencies and/or by clock signals generated by different circuits. As used herein, the term "wireless communications" can include communications governed by the IEEE 802.11 standards, Bluetooth, HiperLAN (a set of wireless standards, comparable to the IEEE 802.11 standards, used primarily in Europe), and other technologies used in wireless communications. Further, the term "mobile device" refers to a wireless communications device capable of wirelessly exchanging data signals with other devices.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components.

Figure 1:
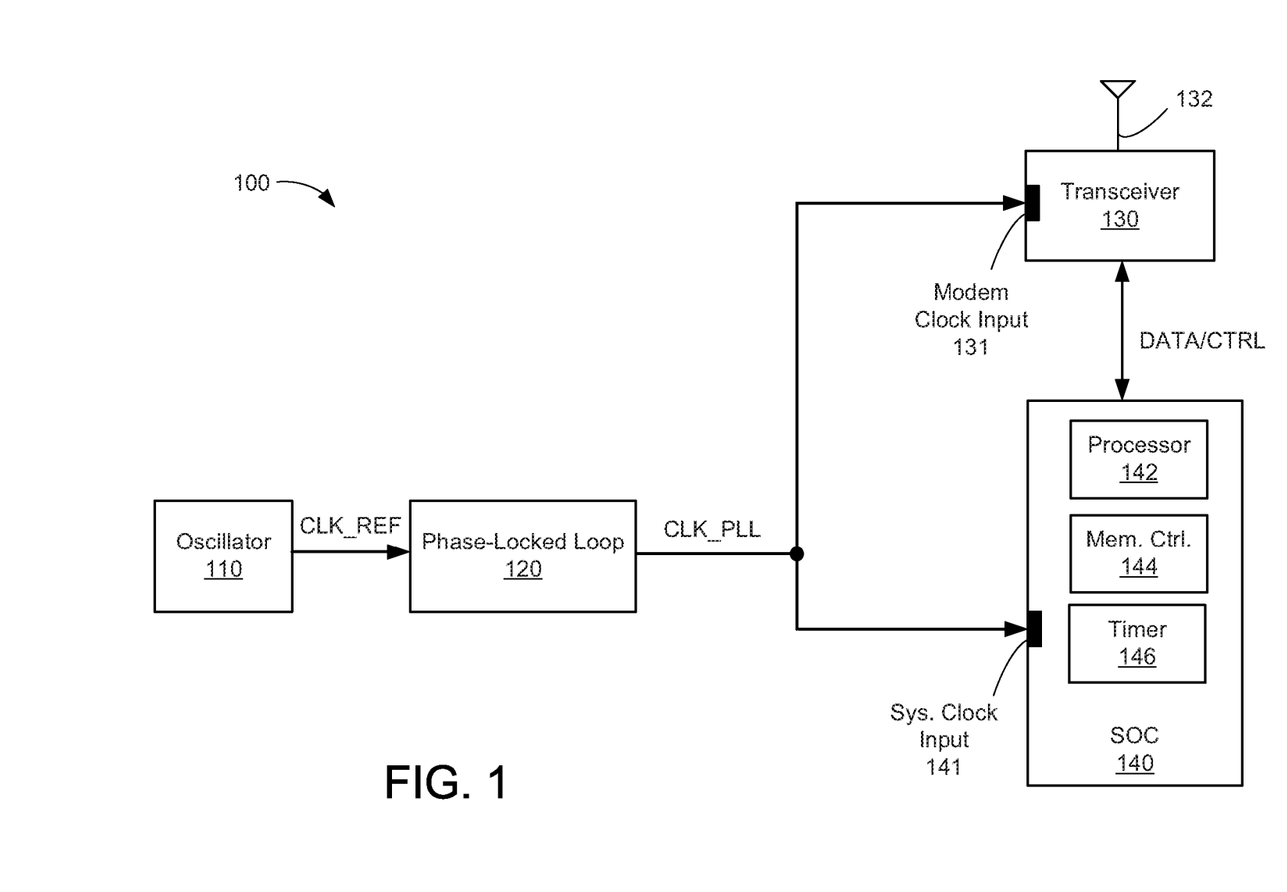
FIG. 1 is a block diagram of a wireless network within which the present embodiments may be implemented.

As mentioned above, mobile devices employing components or modules that are clocked by clock signals of different frequencies may include one or more PLL circuits to generate such clock signals. For example, FIG. 1 shows a mobile device 100 that includes an oscillator 110, a phase-locked loop (PLL) circuit 120, a radio-frequency (RF) transceiver 130, and a system-on-a-chip (SOC) 140. SOC 140 is shown to include a clock input terminal 141, a processor 142, a memory controller 144, and a timer circuit 146. Transceiver 130, which is coupled to an antenna 132 and includes a clock input terminal 131, may exchange data and control signals with SOC 140 and may wirelessly exchange signals with another device (not shown for simplicity) via antenna 132.

Oscillator 110 generates a reference clock signal (CLK_REF). The PLL circuit 120 uses the reference clock signal CLK_REF to generate a PLL output clock signal (CLK_PLL) that may have a frequency greater than the frequency of CLK_REF (e.g., using frequency synthesizing techniques). The PLL output clock signal CLK_PLL is provided to the clock input terminal 131 of transceiver 130 and to the clock input terminal 141 of SOC 140. Thus, for mobile device 100 of FIG. 1, transceiver 130 and the various components or modules of SOC 140 are clocked by clock signals generated by PLL circuit 120. Note that sharing one PLL circuit 120 between transceiver 130 and SOC 140, which is typical in mobile devices, may save power (e.g., as compared with using two separate PLL circuits). Because a digital modem (not shown for simplicity) in transceiver 130 may process data at clock rates different from the frequency of the reference clock signal (e.g., often higher) and may have strict jitter requirements, PLL circuit 120 may be essential to the operation of transceiver 130. Also, when transceiver 130 is operating (e.g., transmitting data), processor 142 and/or the other modules in SOC 140 may need to prepare transmit data for transceiver 130. Conversely, when transceiver 130 is idle, the SOC 140 may have fewer processing demands (e.g., as compared to when transceiver is operating). Unfortunately, because transceiver 130 and SOC 140 use clock signals derived from the same PLL circuit 120, PLL circuit 120 is typically maintained in an operational state even when transceiver 130 is idle (e.g., not transmitting or receiving data signals via antenna 132). Maintaining PLL circuit 120 in an operational state when transceiver 130 is idle may result in unnecessary power consumption.

Figure 2:
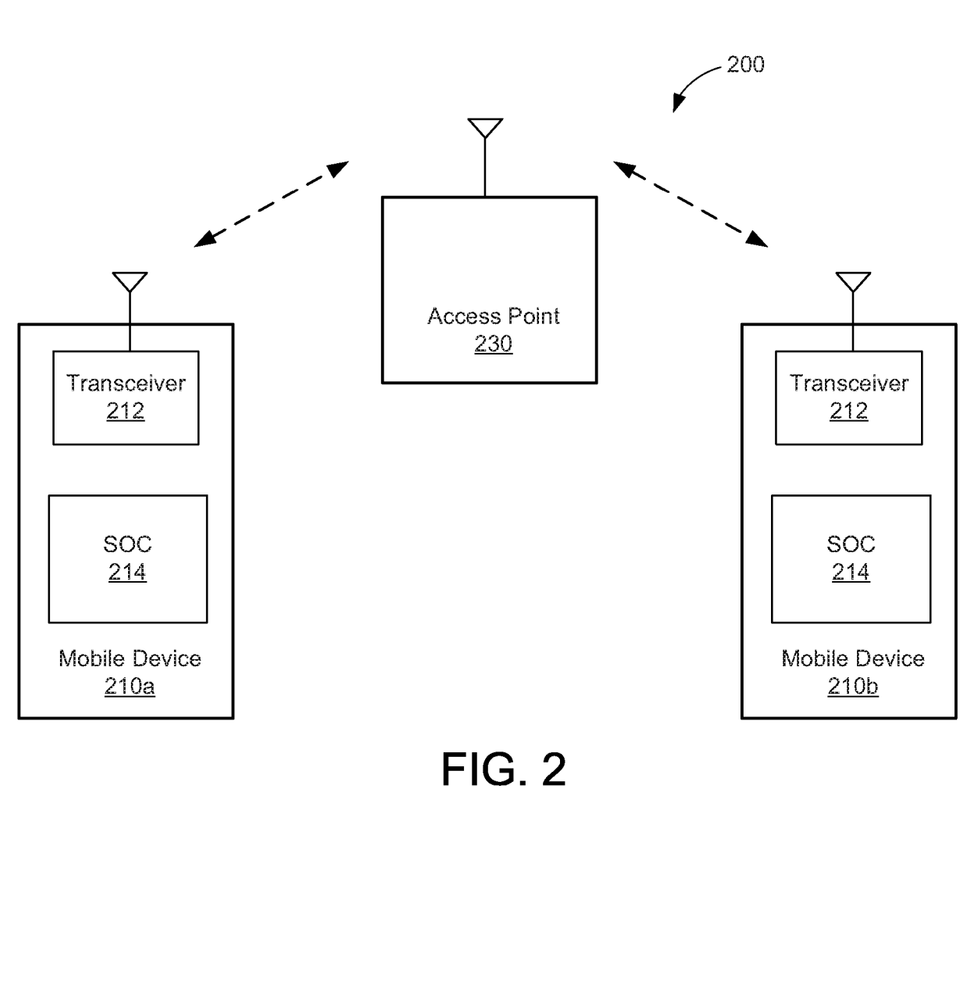
FIG. 2 is a functional block diagram of a mobile device.

FIG. 2 is a block diagram of a wireless network 200 within which the present embodiments may be implemented. The wireless network 200 is shown to include two mobile devices 210a-210b and an access point (AP) 230. The wireless network 200 may be formed by a plurality of Wi-Fi access points that may operate according to the IEEE 802.11 family of standards (or according to other suitable wireless protocols). Thus, although only one AP 230 is shown in FIG. 2 for simplicity, it is to be understood that wireless network 200 can be formed by any number of access points such as AP 230.

AP 230 may be any suitable device that allows one or more mobile devices to connect to a network (e.g., a LAN, WAN, MAN, and/or the Internet) via AP 230 using Wi-Fi, Bluetooth, or any other suitable wireless communication standards. For at least one embodiment, AP 230 may include a network interface, one or more processing resources, one or more transceivers, and one or more memory sources. The memory resources may include a non-transitory computer-readable medium (e.g., one or more nonvolatile memory elements, such as EPROM, EEPROM, Flash memory, a hard drive, etc.) that stores instructions for performing operations associated with facilitating wireless communications for mobile devices 210a and 210b.

Mobile devices 210a and 210b may be any suitable wireless devices including, for example, cell phones, personal digital assistants (PDAs), tablet devices, laptop computers, or the like. For other embodiments, mobile devices 210a and 210b may communicate with other devices using one or more wired communication mediums (e.g., coaxial cables, fiber-optic lines, twisted pair cables, and so on) and associated communication protocols (e.g., Ethernet communications governed by the IEEE 802.3 family of standards). Thus, for at least one other embodiment, mobile devices 210a and 210b may communicate with each other without using AP 230 or wireless network 200. For at least some embodiments, mobile devices 210a and 210b may include one or more transceiver circuits, one or more processing resources, one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 4.

More specifically, for the exemplary embodiment of FIG. 2, each of mobile devices 210a and 210b is shown to include a transceiver 212 and a SOC 214. Transceivers 212 may be configured to exchange data with other devices according to any suitable communication standard or protocol including, for example, Wi-Fi protocols, Bluetooth protocols, cellular communication protocols, and so on. SOCs 214 may include a variety of modules including, for example, central processor unit (CPU) modules, timer modules, bus controller modules, and/or memory controller modules. Further, although not shown in FIG. 2 for simplicity, mobile devices 210a and 210b may also include PLL circuits, oscillators, analog-to-digital converters (ADCs), digital-to-analog converters (DACs), and/or any other suitable circuits or modules.

Figure 3A:
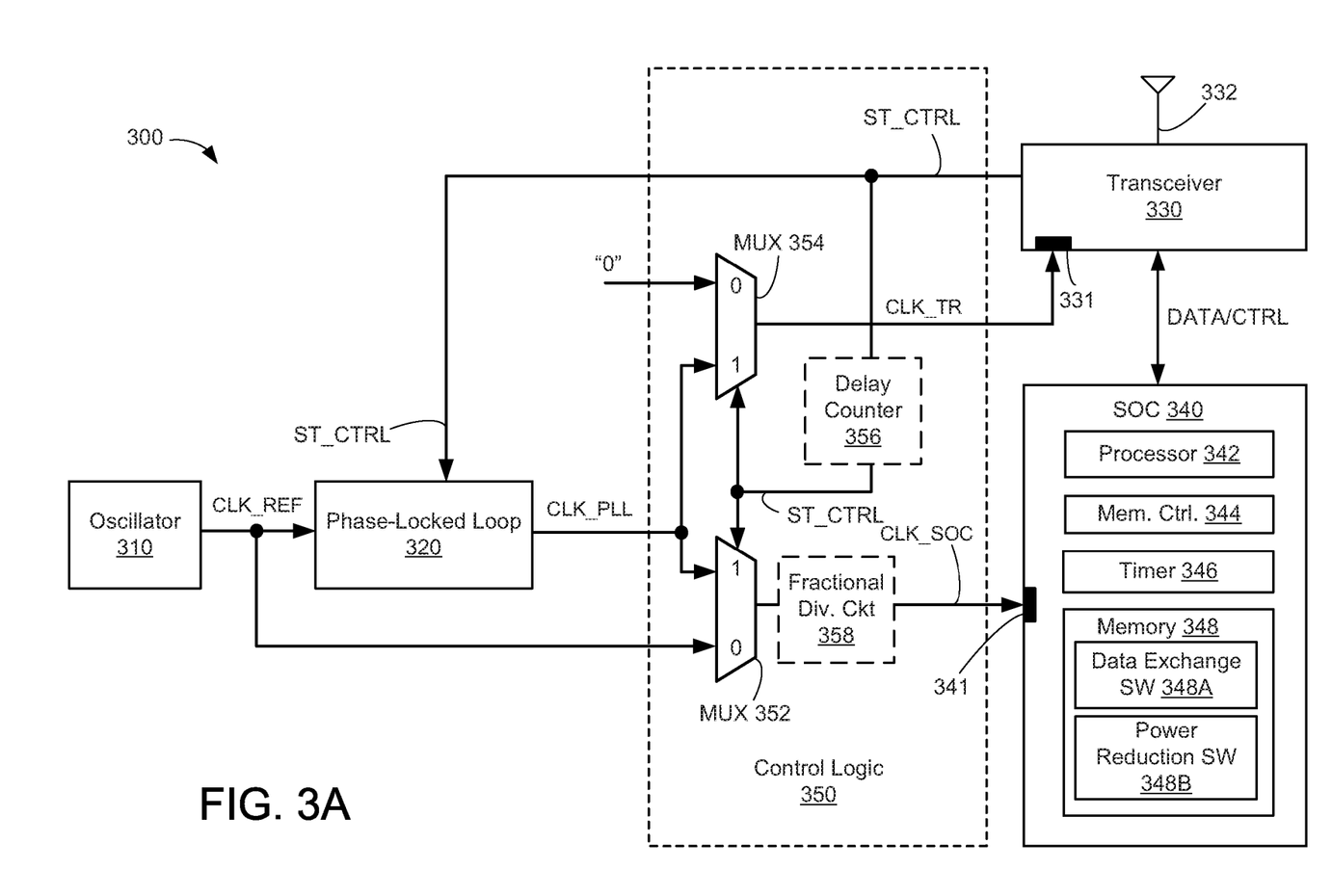
FIG. 3A is a functional block diagram of a mobile device in accordance with some embodiments.

FIG. 3A is a functional block diagram of a mobile device 300 that is one embodiment of the mobile devices 210a-210b of FIG. 2. Mobile device 300 includes an oscillator 310, a phase-locked loop (PLL) circuit 320, a transceiver 330, an SOC 340, and control logic 350. Oscillator 310, which may be any suitable oscillator or clock generation circuit (e.g., a crystal oscillator, a digital oscillator, a voltage-controlled oscillator (VCO), and so on), generates a reference clock signal CLK_REF. The PLL circuit 320 includes an input terminal to receive CLK_REF from oscillator 310, includes an output terminal to provide a PLL output clock signal CLK_PLL, and includes a control terminal to receive a status control signal ST_CTRL. PLL circuit 320 may be any analog, digital, mixed-signal, or other suitable type of PLL circuitry, and may include one or more well-known sub-circuits such as phase detectors, filters, oscillators, feedback loops, frequency dividers, and/or sigma-delta modulators.

Although PLL circuit 320 is depicted as a separate circuit in FIG. 3A for simplicity, for actual embodiments, PLL circuit 320 may be implemented within (or alternatively as a circuit associated with) transceiver 330.

Transceiver 330, which may be any suitable transceiver, is coupled to antenna 332 and includes a clock input terminal 331 to receive a transceiver clock signal CLK_TR. Transceiver 330 also includes a control terminal to output the status control signal ST_CTRL, which may indicate an operating status of transceiver 330. More specifically, in accordance with some embodiments, the status control signal ST_CTRL may be a 1-bit signal indicating whether transceiver 330 is currently transmitting and/or receiving data signals via antenna 332. For example, when transceiver 330 is idle, control signal ST_CTRL may be de-asserted (e.g., to logic low) to indicate that there is no wireless transmission (or "on-air transaction") taking place; conversely, when transceiver 330 is active, control signal ST_CTRL may be asserted (e.g., to logic high) to indicate that there is a wireless transmission (or "on-air transaction") taking place. For other embodiments, control signal ST_CTRL may include more than 1 bit, for example, to indicate a plurality of active and/or idle states.

Further, although shown in FIG. 3A as coupled to one antenna 332, for other embodiments, transceiver 330 may be coupled to a plurality of antennas. In addition, for at least some embodiments, mobile device 300 may include a plurality of transceivers 330 and/or antennas (e.g., to allow for multiple-input/multiple-output (MIMO) operations).

The SOC 340 is shown in FIG. 3A to include a processor 342, a memory controller 344, a timer 346, and a memory 348 for simplicity only. For actual embodiments, SOC 340 may include any number of additional modules. Thus, the SOC 340 and components 342, 344, 346, and 348 shown in FIG. 3A are exemplary, and mobile device 300 may include more than one SOC 340. SOC 340 also includes one or more clock input terminals 341 to receive one or more system clock signals CLK_SOC that may be used to clock and/or provide timing mechanisms for its various modules (e.g., for processor 342, memory controller 344, timer 346, and/or memory 348). Memory controller 344, which may be any suitable memory controller, may control operation of memory 348. Timer 346, which may be any suitable timer circuit, may control timing of various modules within SOC 340.

Figure 4:
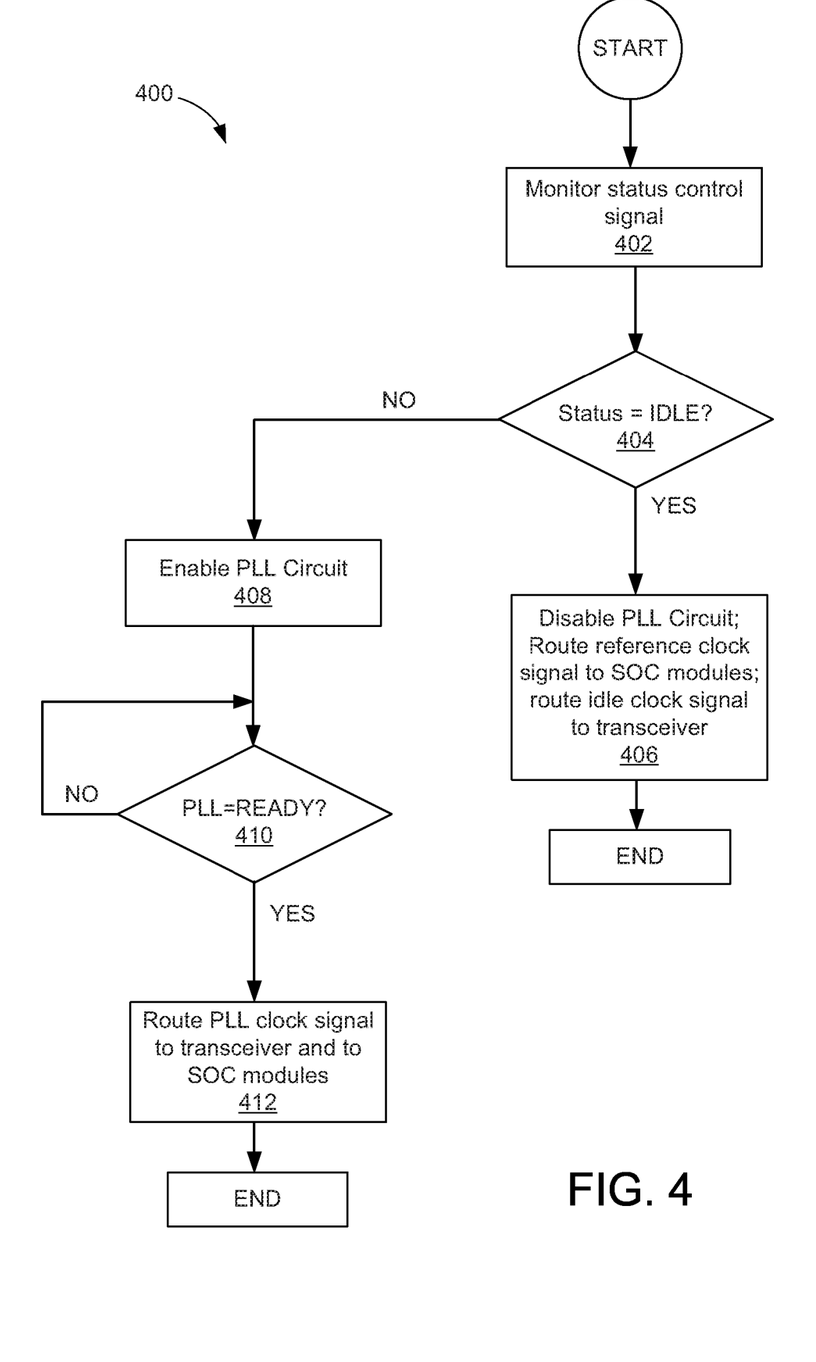
FIG. 4 is an illustrative flowchart depicting an exemplary power reduction operation in accordance with some embodiments.

Memory 348 may include a non-transitory computer-readable medium (e.g., one or more nonvolatile memory elements, such as EPROM, EEPROM, Flash memory, a hard drive, and so on) that can store the following software modules:
- a data exchange software module 348A to facilitate the creation and/or exchange of various data signals with another device; and
- a power reduction software module 348B to monitor the status of transceiver 330 and/or to control operation of control logic 350 (e.g., as described for operations 402, 404, 406, 408, 410, and/or 412 of FIG. 4).

Each software module includes instructions that, when executed by processor 342, cause mobile device 300 to perform the corresponding functions. The non-transitory computer-readable medium of memory 348 thus includes instructions for performing all or a portion of the operations of the method of FIG. 4.

Processor 342 may be any suitable processor capable of executing scripts or instructions of one or more software programs stored in mobile device 300 (e.g., within memory 348). For example, processor 342 can execute data exchange software module 348A to facilitate the creation and/or exchange of various data signals with another device. Processor 342 can also execute power reduction software module 348B to monitor the status of transceiver 330 and/or to control operation of control logic 350. For some embodiments, processor 342 operates as a central processing unit (CPU) for mobile device 300, and may control operation of transceiver 330.

Control logic 350 includes two multiplexer (MUXes) 352 and 354, a first input terminal to receive CLK_PLL from PLL circuit 320, a second input terminal to receive an idle clock signal (e.g., a logic low signal "0"), a third input terminal to receive the status control signal ST_CTRL from transceiver 330, a first output terminal to provide ST_CTRL to PLL circuit 320, a second output terminal to provide the transceiver clock signal CLK_TR to transceiver 330, and third output terminals to provide one or more system clock signals CLK_SOC to SOC 340. Control logic 350 may optionally include a delay counter 356 and/or fractional divider circuit 358, as described in more detail below.

MUX 352 includes a first input terminal to receive CLK_REF from oscillator 310, a second input terminal to receive CLK_PLL from PLL circuit 320, an output terminal to provide CLK_SOC to SOC 340, and a control terminal to receive the status control signal ST_CTRL. As explained in more detail below, MUX 352 may selectively route either CLK_REF or CLK_PLL as CLK_SOC to SOC 340 in response to ST_CTRL.

MUX 354 includes a first input terminal to receive the idle clock signal, a second input terminal to receive CLK_PLL from PLL circuit 320, an output terminal to provide CLK_TR to transceiver 330, and a control terminal to receive the status control signal ST_CTRL. As explained in more detail below, MUX 354 may selectively route either the idle clock signal or CLK_PLL as CLK_TR to transceiver 330 in response to ST_CTRL.

During operation of mobile device 300, transceiver 330 (or alternatively another suitable circuit that monitors transmission/reception activities of transceiver 330) selectively asserts the status control signal ST_CTRL to indicate its operational status. The state of ST_CTRL may be used to selectively disable PLL circuit 320 and/or to control operation of MUXes 352 and 354. For example, when transceiver 330 is in an active state (e.g., transmitting and/or receiving data signals), the status control signal ST_CTRL may be asserted (e.g., to logic high). In response thereto, MUX 352 routes CLK_PLL as CLK_SOC to SOC 340 via its clock input terminal 341, and MUX 354 routes CLK_PLL as CLK_TR to transceiver 330 via its clock input terminal 331. In addition, the asserted state of ST_CTRL may be used to maintain PLL circuit 320 in the enabled state. In this manner, when transceiver 330 is active, both transceiver 330 and SOC 340 may use respective clock signals CLK_TR and CLK_SOC generated by (or derived from) PLL circuit 320. Because transceiver 330 may operate at a data rate that requires its clock signal CLK_TR to be of a greater frequency than (e.g., many multiples of) the frequency of CLK_REF, the higher-frequency clock signal CLK_PLL generated by PLL circuit 320 allows transceiver 330 to achieve its desired data rates. In addition, the clock signal CLK_PLL generated by PLL circuit 320 may be desirable to suppress jitter associated with transmitting and/or receiving signals using transceiver 330.

Conversely, when transceiver 330 is in an idle state (e.g., neither transmitting nor receiving data signals), the status control signal ST_CTRL may be de-asserted (e.g., to logic low). In response thereto, MUX 352 routes CLK_REF as CLK_SOC to SOC 340 via its clock input terminal 341, and MUX 354 routes the idle clock signal as CLK_TR to transceiver 330 via its clock input terminal 331. In addition, the de-asserted state of ST_CTRL may be used to disable PLL circuit 320, thereby reducing power consumption of mobile device 300.

Table 1 below summarizes the operations of MUXes 352 and 354 and the state of PLL circuit 320 in response to the status control signal ST_CTRL.

TABLE 1

| ST_CTRL | MUX 352 | MUX 354 | PLL Circuit 320 |
|---|---|---|---|
| 0 (IDLE) | CLK_SOC = CLK_REF | CLK_TR = 0 | disabled |
| 1 (active) | CLK_SOC = CLK_PLL | CLK_TR = CLK_PLL | enabled |

Although not shown for simplicity, for other embodiments, mobile device 300 may include a PLL ready detector (e.g., within or associated with control logic 350) to detect whether PLL circuit 320 is fully operational (e.g., whether PLL circuit 320 has stabilized its output clock signal CLK_PLL). For such embodiments, control logic 350 may be configured to provide CLK_PLL to transceiver 330 and/or SOC 340 only if the PLL ready detector indicates that PLL circuit 320 is fully operational.

For other embodiments, delay counter 356 may be used to ensure that control logic 350 routes CLK_PLL to transceiver 330 and/or SOC 340 only after PLL circuit 320 has become fully operational (e.g., after CLK_PLL is stabilized and phase-locked with CLK_REF). More specifically, delay counter 356 may delay delivery of the asserted control signal ST_CTRL to the control terminals of MUXes 352 and 354 by a delay period that ensures PLL circuit 320 has sufficient time to stabilize and/or phase lock its output clock signal CLK_PLL after being enabled by the asserted state of ST_CTRL. The delay period provided by delay counter 356 may be a predetermined value or may be dynamically adjusted (e.g., in response to operating characteristics of PLL circuit 320 and/or various operating conditions of mobile device 300). It is noted that delay counter 356 may be easier to implement and/or may have a lesser impact upon device performance than the aforementioned PLL ready detector, particularly if the delay period is a known static value.

For some embodiments, when transceiver 130 is idle, one or more modules in SOC 340 may use other clock signals having frequencies different than the frequency of the reference clock signal. If the frequency of these other clock signals is a multiple of the frequency of the reference clock signal, then an integer clock divider circuit may be used to generate these other clock signals for these modules. Conversely, if the frequency of these other clock signals is less than the frequency of the reference clock signal, then fractional clock divider circuit 358 may be used to generate these other clock signals. In this manner, fractional clock divider circuit 358 may further reduce power consumption of mobile device 300. Fractional clock divider circuit 358 may also provide accurate frequency clock signals with reasonable clock jitter for SOC 140. For some embodiments, fractional clock divider circuit 358 may be enabled in response to the status control signal ST_CTRL (e.g., enabled when transceiver 330 is idle and/or disabled when transceiver 330 is not idle).

Figure 3B:
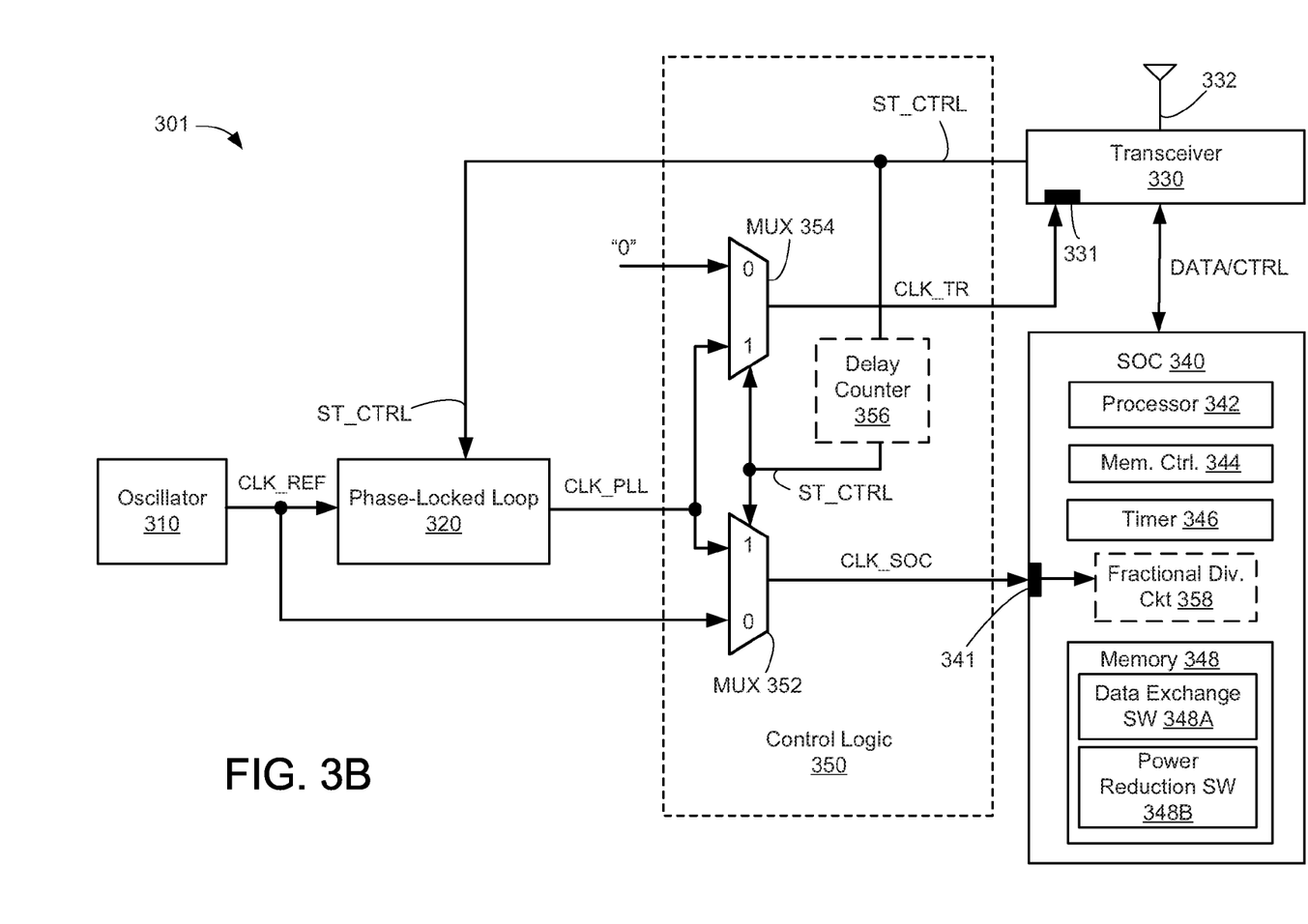
FIG. 3B is a functional block diagram of a mobile device in accordance with other embodiments.

For other embodiments, fractional divider circuit 358 may be included within SOC 340, for example, as depicted in FIG. 3B. More specifically, FIG. 3B shows a mobile device 301 that is another embodiment of the mobile devices 210a-210b of FIG. 2. Mobile device 301 of FIG. 3B is similar to mobile device 300 of FIG. 3A, except that fractional divider circuit 358 is provided within SOC 340 (e.g., rather than within control logic 350). Providing fractional divider circuit 358 within SOC 340 may allow some modules of SOC 340 to receive the CLK_SOC signal provided by MUX 352 while allowing other modules of SOC 340 to receive a lower frequency clock signal generated by fractional divider circuit 358. In addition, the embodiment of FIG. 3B may allow fractional divider circuit 358 to reduce power consumption by selectively enabling fractional divider circuit 358 only when the lower frequency clock signal is to be provided to these "other" modules of SOC 340.

FIG. 4 is an illustrative flow chart 400 depicting an exemplary power reduction operation in accordance with some embodiments. First, control logic 350 monitors the status control signal ST_CTRL to determine whether transceiver 330 is active or idle (402). If the status control signal ST_CTRL indicates that transceiver 330 is idle, as tested at 404, then control logic 350 disables PLL circuit 320, routes CLK_REF as CLK_SOC to SOC 340, and routes the idle clock signal (e.g., a logic low signal "0") to transceiver 330 (406). In this manner, power consumption is reduced by disabling PLL circuit 320, and the various modules of SOC 340 may remain operational by using clock signals derived from oscillator 310 rather than from PLL circuit 320.

Conversely, if the status control signal ST_CTRL indicates that transceiver 330 is active, as tested at 404, then control logic 350 enables PLL circuit 320 (or maintains PLL circuit 320 in its enabled state) (408). In this manner, control logic 350 ensures that transceiver 330 may use clock signals derived from the PLL output clock signal CLK_PLL. Control logic 350 may then determine if PLL circuit 320 is fully operational (e.g., whether CLK_PLL is stabilized and is phase-locked with CLK_REF (410). This determination may be performed using the above-mentioned PLL ready detector or delay counter 356. If PLL circuit 320 is not ready, then control logic 350 may wait until PLL circuit 320 is ready before it performs the next step. Conversely, if PLL circuit 320 is ready, as tested at 410, then control logic 350 routes CLK_PLL as CLK_SOC to SOC 340, and routes CLK_PLL as CLK_TR to transceiver 330 (412).

While flowchart 400 includes a number of operations that are depicted as performed in a specific order, it is noted that the process 400 may include more or fewer operations, which can be performed serially or in parallel. Further, the order of execution of any number of the operations of flowchart 400 may be changed, and/or two or more operations may be combined into a single operation. For example, for some embodiments, step 410 of FIG. 4 may be omitted. Also, while START signals and END signals are depicted in FIG. 4, a person having ordinary skill in the art will understand that they do not mean that the control process 400 necessarily ends after one iteration, and that the method of FIG. 4 may continue to operate throughout normal operations of mobile device 300.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A mobile device, comprising:
   an oscillator to generate a reference clock signal;
   a phase-locked loop (PLL) circuit to generate a PLL clock signal in response to the reference clock signal, wherein the PLL circuit includes a control terminal responsive to a status control signal;
   a transceiver including a clock input terminal, and including an output terminal to generate the status control signal, wherein the status control signal indicates whether the transceiver is in an active state or in an idle state;

a system-on-a-chip (SOC) including a clock input terminal; and control logic to selectively disable the PLL circuit in response to the status control signal and to selectively route the PLL clock signal to the clock input terminal of the transceiver and to the clock input terminal of the SOC in response to the status control signal, wherein the control logic comprises:

a first multiplexer including a first input terminal to receive the reference clock signal, a second input terminal to receive the PLL clock signal, a control terminal to receive the status control signal, and an output terminal coupled to the clock input terminal of the SOC; and a second multiplexer including a first input terminal to receive an idle clock signal, a second input terminal to receive the PLL clock signal, a control terminal to receive the status control signal, and an output terminal coupled to the clock input terminal of the transceiver.

2. The mobile device of claim 1, wherein the SOC comprises a processor.

3. The mobile device of claim 1, wherein the control logic is to disable the transceiver if the status control signal indicates the transceiver is in the idle state.

4. The mobile device of claim 3, wherein the control logic is to route the reference clock signal to the clock input terminal of the SOC if the status control signal indicates the transceiver is in the idle state.

5. The mobile device of claim 4, wherein the control logic is to route the idle clock signal to the clock input terminal of the transceiver if the status control signal indicates the transceiver is in the idle state.

6. The mobile device of claim 1, wherein in response to the status control signal indicating the transceiver is in the active state, the control logic is to:
enable the PLL circuit;
route the PLL clock signal to the clock input terminal of the SOC; and
route the PLL clock signal to the clock input terminal of the transceiver.

7. The mobile device of claim 1, wherein the device further comprises:
a fractional divider circuit to divide a frequency of a clock signal provided to the clock input terminal of the SOC.

8. The mobile device of claim 7, wherein the fractional divider circuit is enabled in response to the status control signal.

9. The mobile device of claim 1, wherein the control logic further comprises:
a delay counter including an input to receive the status control signal and including an output coupled to the control terminal of the first multiplexer and to the control terminal of the second multiplexer.

10. The mobile device of claim 9, wherein the delay counter is to delay delivery of the status control signal to the control terminal of the first multiplexer and to the control terminal of the second multiplexer by a delay period.

11. The mobile device of claim 10, wherein the delay period corresponds to a period of time for the PLL circuit to stabilize the PLL clock signal upon being enabled by the status control signal.

12. A method for operating a mobile device including a transceiver, an oscillator, a processor, and a phase-locked loop (PLL) circuit, the method comprising:
monitoring a status control signal indicating whether the transceiver is in an active state or in an idle state;
selectively disabling the PLL circuit in response to the status control signal;

generating a first multiplexed signal containing either a reference clock signal or a PLL clock signal generated by the PLL circuit, depending on the status control signal;
routing the first multiplexed signal to the processor;
generating a second multiplexed signal containing either an idle clock signal or the PLL clock signal, depending on the status control signal; and
routing the second multiplexed signal to a clock input terminal of the transceiver.

13. The method of claim 12, wherein the selectively disabling comprises:
enabling the PLL circuit if the status control signal indicates that the transceiver is in the active state; and
disabling the PLL circuit if the status control signal indicates that the transceiver is in the idle state.

14. The method of claim 12, wherein the first multiplexed signal contains the reference clock signal if the status control signal indicates the transceiver is in the idle state, and contains the PLL clock signal if the status control signal indicates the transceiver is in the active state.

15. The method of claim 14, wherein the second multiplexed signal contains the idle clock signal if the status control signal indicates the transceiver is in the idle state, and contains the PLL clock signal if the status control signal indicates the transceiver is in the active state.

16. The method of claim 12, further comprising:
determining whether the PLL clock signal is stabilized before routing the PLL clock signal to the processor.

17. The method of claim 12, further comprising:
delaying, by a delay period, the routing of the PLL clock signal to the processor after enabling the PLL circuit.

18. The method of claim 12, further comprising:
enabling a fractional clock divider circuit in response to the status control signal.

19. A computer-readable medium containing program instructions that, when executed by a processor of a mobile device, cause the mobile device to:
monitor a status control signal indicating whether a transceiver of the mobile device is in an active state or in an idle state;
selective disabling a phase-locked loop (PLL) circuit of the mobile device in response to the status control signal; and
generate a first multiplexed signal containing either a reference clock signal or a PLL clock signal generated by the PLL circuit, depending on the status control signal;
route the first multiplexed signal to the processor;
generate a second multiplexed signal containing either an idle clock signal or the PLL clock signal, depending on the status control signal; and
route the second multiplexed signal to a clock input terminal of the transceiver.

20. The computer-readable medium of claim 19, wherein execution of the program instructions further cause the mobile device to:
disable the PLL circuit if the status control signal indicates that the transceiver is in the idle state; and
enable the PLL circuit if the status control signal indicates that the transceiver is in the active state.

21. The computer-readable medium of claim 19, wherein the first multiplexed signal contains the reference clock signal if the status control signal indicates that the transceiver is in the idle state, and contains the PLL clock signal if the status control signal indicates the transceiver is in the active state.

22. The computer-readable medium of claim 21, wherein the second multiplexed signal contains the idle clock signal if the status control signal indicates the transceiver is in the idle state, and contains the PLL clock signal if the status control signal indicates the transceiver is in the active state.

23. The computer-readable medium of claim 19, wherein execution of the program instructions further cause the mobile device to:
determine whether the PLL clock signal is stabilized before routing the PLL clock signal to the processor.

24. The computer-readable medium of claim 19, wherein execution of the program instructions further cause the mobile device to:
delay, by a delay period, the routing of the PLL clock signal to the processor after enabling the PLL circuit.

25. The computer-readable medium of claim 19, wherein execution of the program instructions further cause the mobile device to:
enable a fractional clock divider circuit in response to the status control signal.

26. A mobile device, comprising:
means for monitoring a status control signal indicating whether a transceiver of the device is in an active state or in an idle state;
means for selectively disabling a PLL circuit of the device in response to the status control signal;
means for generating a first multiplexed signal containing either a reference clock signal or a PLL clock signal generated by the PLL circuit, depending on the status control signal;
means for routing the first multiplexed signal to a processor of the mobile device;
means for generating a second multiplexed signal containing either an idle clock signal or the PLL clock signal, depending on the status control signal; and
means for routing the second multiplexed signal to a clock input terminal of the transceiver.

27. The mobile device of claim 26, wherein the means for selectively disabling is to:
enable the PLL circuit if the status control signal indicates that the transceiver is in the active state; and
disable the PLL circuit if the status control signal indicates that the transceiver is in the idle state.

28. The mobile device of claim 26, wherein the first multiplexed signal contains the reference clock signal if the status control signal indicates that the transceiver is in the idle state, and contains the PLL clock signal if the status control signal indicates the transceiver is in the active state.

29. The mobile device of claim 28, wherein the second multiplexed signal contains the idle clock signal if the status control signal indicates the transceiver is in the idle state, and contains the PLL clock signal if the status control signal indicates the transceiver is in the active state.

30. The mobile device of claim 26, further comprising:
means for determining whether the PLL clock signal is stabilized before routing the PLL clock signal to the processor.

31. The mobile device of claim 26, further comprising:
means for delaying, by a delay period, the routing of the PLL clock signal to the processor after enabling the PLL circuit.

32. The mobile device of claim 26, further comprising:
means for enabling a fractional clock divider circuit in response to the status control signal.

* * * * *